US006138707A

United States Patent [19]

Stuart

[11] Patent Number: 6,138,707

[45] **Date of Patent: *Oct. 31, 2000**

[54] FUEL STORAGE TANKS

[75] Inventor: Graham M. Stuart, Surrey, United Kingdom

[73] Assignee: W & J Risbridger Limited, United Kingdom

[ * ] Notice: This patent is subject to a terminal disclaimer.

[21] Appl. No.: 09/292,250

[22] Filed: Apr. 15, 1999

[30] Foreign Application Priority Data

Apr. 21, 1998 [GB] United Kingdom .................. 9808483

[51] Int. Cl.[7] .......................... F16K 24/04; F16K 31/22; F16K 31/24

[52] U.S. Cl. ......................... 137/202; 137/433; 137/448; 137/592; 141/59; 141/198

[58] Field of Search ............................... 137/39, 43, 192, 137/202, 430, 433, 388, 389, 592, 448; 141/59, 198, 65, 66

[56] References Cited

U.S. PATENT DOCUMENTS

| | | | |
|---|---|---|---|
| 1,261,044 | 4/1918 | McCracken | 137/202 |
| 1,629,789 | 5/1927 | Harrison | 137/202 |
| 2,510,098 | 6/1950 | Geisler | 137/202 |
| 2,646,817 | 7/1953 | Cox et al. | 137/202 |
| 2,767,551 | 10/1956 | Clute | 137/433 |
| 2,767,552 | 10/1956 | Clute | 137/433 |
| 4,011,884 | 3/1977 | Drori | 137/202 |
| 4,640,304 | 2/1987 | Looney | 137/202 |
| 4,778,595 | 10/1988 | Sable et al. | 137/202 |
| 4,917,795 | 4/1990 | Sable et al. | 137/202 |
| 4,986,320 | 1/1991 | Kesterman et al. | 141/198 |
| 5,027,870 | 7/1991 | Butterfield | 141/198 |
| 5,028,244 | 7/1991 | Szlaga | 137/202 |
| 5,386,843 | 2/1995 | Church | 137/202 |
| 5,564,465 | 10/1996 | Pettesch | 137/448 |
| 5,590,697 | 1/1997 | Benjey et al. | 141/198 |

FOREIGN PATENT DOCUMENTS

| | | | |
|---|---|---|---|
| 0 327 518 | 8/1989 | European Pat. Off. . | |
| 0054781 | 4/1980 | Japan | 137/202 |
| 2 301 347 | 4/1996 | United Kingdom . | |

*Primary Examiner*—George L. Walton
*Attorney, Agent, or Firm*—Andrus, Sceales, Starke & Sawall

[57] ABSTRACT

An air transfer valve is disclosed comprising a housing (8) having an inlet (21) and an outlet (22), the outlet being controlled by a first non-return, valve (28) which is biased to its closed position and the outlet being controlled by a second valve (30) which is normally in its open position, the first valve being caused to open by an increase in air pressure within the valve but closing in response to reduced pressure. The valve is intended to be fitted into a fill pipe (1) of a fuel storage tank so that the outlet communicate with the tank ullage through an aligned hole in the wall of the fill pipe. In this situation, the valve transfers air from the fill pipe into the ullage and reduces turbulence which would otherwise cause excessive generation of vapor during tank filling (FIG. 1).

10 Claims, 5 Drawing Sheets

FUEL STORAGE TANKS

BACKGROUND OF THE INVENTION

This invention relates to fuel storage tanks, especially gasoline/petrol storage tanks, and in particular, is concerned with means for reducing the generation of fuel vapour during filling of such tanks.

In conventional installations, a fuel pipe extends into the storage tank from outside and has an outlet situated close to the bottom of the tank. When the tank is refilled or topped up, e.g. from a road tanker, fuel is delivered at a high flow rate by gravity feed through the fill pipe. This displaces vapour contained in the tank which is either recovered via a vapour recovery line back to the tanker or is vented to atmosphere via a vent valve.

During the start of the delivery process the fuel delivered by the tanker displaces the air mass or slug in the fill hose and fill pipe into the tank below the liquid level. In these circumstances, a great deal of fluid turbulence is generated in the tank which causes a break up of the stratified high density vapour layers immediately above the liquid surface in the tank. As a result, high density vapour is mixed with low density ullage vapour, increasing the particle count or average vapour density level of the displaced tank vapour. As high density vapour contains a significant fuel volume and fuel volume is metered directly into the tank by the tanker delivery system, this constitutes a loss by the owner of the filling station.

A secondary effect of passing volume of air through liquid fuel is the direct generation of fuel vapour, thus adding to the total vapour volume and subsequent losses. This effect, combined with the disturbance of the vapour layers previously discussed, increases the ullage vapour pressure causing the vapour vent relief valve to open and remain open, even when fuel filling is completed, again adding to vapour (fuel) losses, an environmental and economic concern.

EP-0327518 describes one solution to this problem. In the filling system proposed in this patent, holes are formed in the fill pipe above the normal liquid level in the tank so that the interior of the fill pipe communicates with the head space or ullage. A second, smaller inner pipe is inserted concentrically into the fill pipe and has holes which connect its interior with the space between the two pipes. Fuel is filled via the inner pipe and air and vapour passes through the holes in the inner pipe into the space between the two pipes. Some vapour and air passes through the holes in the fill pipe into the head space, while vapour remaining between the two pipes is collected via a vapour recovery system.

GB Specification No. 2301347 describes a similar system in that the fill pipe is also fitted with a second, perforated inner pipe. In this system, however, the fuel is introduced into the space between the fill pipe and the inner pipe and air carried in with the fuel is stated to pass into the inner pipe through the perforations, and vapour is collected from the inner pipe via an external vapour collection system.

Both of the above systems are relatively costly and involve the introduction of a substantial number of pipework connections and potential fuel and vapour leakage points.

It is an object of the present invention to provide cost effective, integral means for controlling the turbulence and vapour generation during filling of fuel storage tanks, while avoiding the problems of the prior art.

SUMMARY OF THE INVENTION

According to one aspect of the present invention, there is provided a fuel storage tank having a fill pipe which is arranged to discharge within the tank below the normal liquid level in the tank, and an air transfer valve mounted within the fill pipe above the normal maximum liquid level, said valve being normally closed and having an outlet communicating with the head space in the tank and an inlet directed away from the direction of fluid flow in the fill pipe, and operating means within said valve for opening said valve in response to increased pressure in the fill pipe arising from air or vapour carried by fuel flowing in said pipe.

The air transfer valve is conveniently attached to the inside of the fill pipe, just above the normal maximum liquid level, and includes operating means comprising a valve which is normally held in its closed position by gravity or a light closure spring. When air enters the top of the fill pipe, e.g. when it is connected to a road tanker's fuel supply pipe, there is an increase in pressure due to the column of liquid fuel from the tanker compressing air in the fuel supply pipe. The weight of the valve member or the strength of the closure spring is chosen so that, in these circumstances, the valve will open and allow air to pass through the valve and into the head space of the tank through an opening in the wall of the fill pipe. The body of the valve may have an outlet aligned with a hole through the fill pipe wall and sealed thereto.

The valve has an inlet which faces away from the direction of fluid flow in the fill pipe so that fuel does not directly impinge on the inlet to the valve. The housing of the valve is preferably streamlined in shape and has a cross-sectional area which is small in comparison with the area of the fill pipe, so as to cause minimum disruption to the flow of fuel into the tank.

A flame arrester is preferably incorporated in the inlet to the valve in order to prevent any flame transfer between the fill pipe and the ullage of the liquid storage tank.

The air transfer valve preferably includes a second valve member whose purpose is to prevent the flow of liquid fuel through the air transfer valve and into the ullage of the liquid storage tank. The second valve member is normally open but due to its closes in response to liquid entering the housing of the air transfer valve. The second valve member includes a float member. Preferably, the float member is a hollow plastic or metal ball, which is buoyant and thus rises and floats on liquid fuel entering the housing of the air transfer valve. In order to prevent the second valve rising and closing onto its seat in response to increased air pressure in the fill pipe, the hollow ball or other float member constituting the second valve is retained in its open position by a venturi effect generated by air flow through the valve housing.

According to a second embodiment of the invention, an air transfer valve and a flap valve are assembled together so prevent overfilling of the liquid storage tank. The assembly is comprised of a tubular member wherein the air transfer valve is fitted on a wall therein. The air transfer valve, described previously, has an outlet that is aligned with a hole located in the wall of the tubular member, and an inlet that communicates with the interior of the tubular member. The air transfer valve has a first valve member that opens in response to an increase in air pressure in the tubular member, and a second valve member that closes in response to liquid entering said second valve member. An overfill valve is also mounted on the tubular member. The overfill valve is comprised of a float and a vane linked thereto. The float and vane act together to block the passage of liquid through the tubular member on activation of the float. Thus, the overfill valve is effective to restrict the flow of liquid into the tubular member by detecting a rise of liquid in the tank beyond a predetermined level.

BRIEF DESCRIPTION OF THE DRAWINGS

One embodiment of a fuel storage tank, e.g. a gasoline storage tank in accordance with the invention, and an air transfer valve for use therein, will now be described with reference to the accompanying drawings, in which.

DETAILED DESCRIPTION OF THE INVENTION

Figure 1:
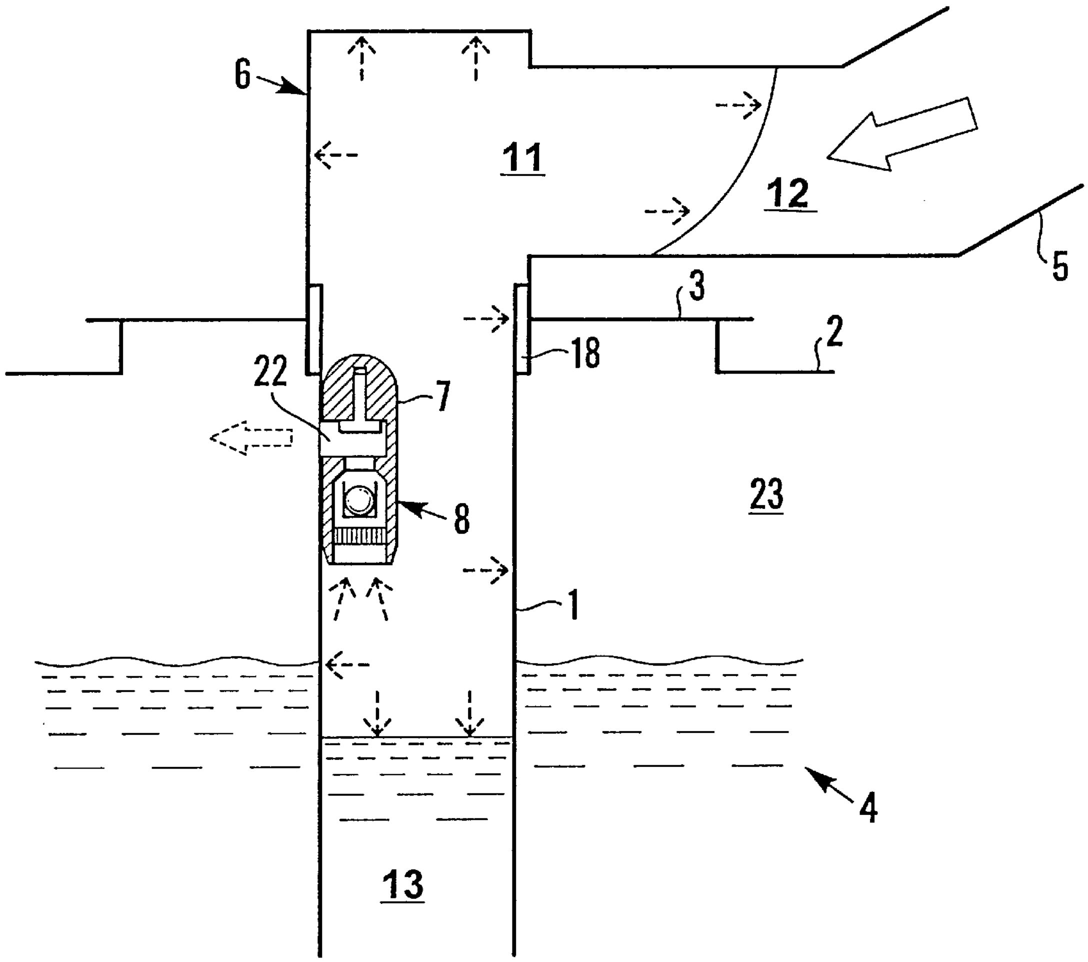
FIG. 1 shows schematically the top part of the fuel storage tank with the air transfer valve in its open condition.

Referring to the drawings:

FIG. 1 shows a fuel fill pipe 1 extending into a fuel storage tank 2 through a manhole or inspection cover 3. As can be seen, the fill pipe 1 extends below the normal liquid level 4 in the tank and, in fact, although not shown in the drawings, will extend to within a few inches from the base of the tank. The lower end of the fill pipe preferably terminates in a diffuser in order to minimise vapour generation. Suitable diffusers include the type comprising two concentric apertured pipes in which the discharge apertures in one pipe are offset by about 180° from those in the other pipe. A preferred diffuser provides a series of horizontally disposed slots encouraging laminar flow as described in our co-pending UK patent application no. 9709587.1. Fuel is transferred to the fill line 1 from a hose 5, connected to the delivery tanker via a T-piece connector 6. Although not shown in the drawing, a conventional supply valve at the tanker can be shut off after the delivery has been concluded in accordance with normal practice.

Mounted within the fill pipe 1 and above the normal liquid level 4, is an air transfer valve 7. Valve 7 is of compact construction and has a streamlined generally cylindrical housing 8 so as to minimise disturbance of fluid flow into the tank. As can be seen, the cross-section of the housing 8 is small, relative to the cross-sectional diameter of the fill pipe 1.

The fill pipe is constructed separately from the T-piece connector 6. This arrangement enables the air transfer valve to be pre-assembled and sealed to the inner wall of the pipe and cut to the desired length appropriate for the tank. At its upper end, the fill pipe may have a lip or collar 18 for supporting the pipe in the manhole cover 3. A conventional seal may be provided, e.g. a threaded port, for sealing the T-piece connector 6 to the collar 18 or manhole cover 3.

Figure 2:
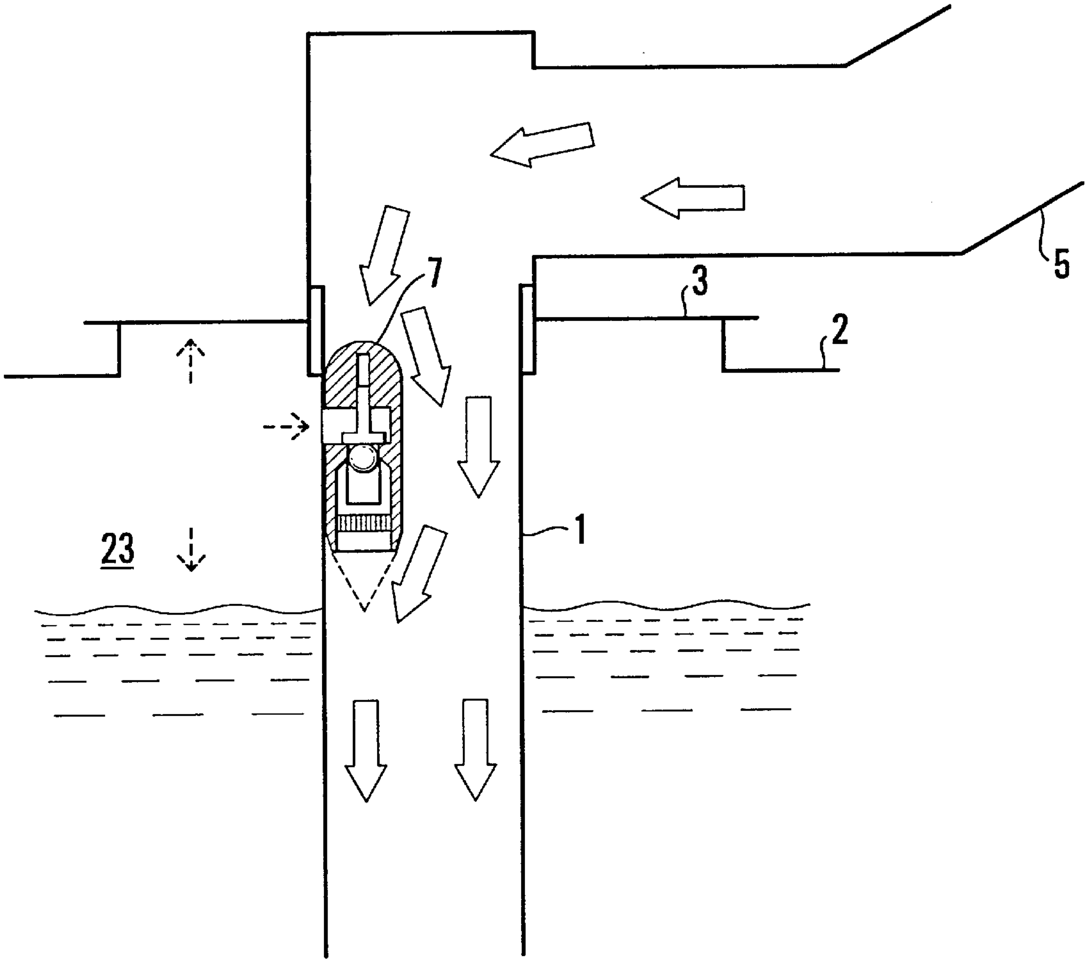
FIG. 2 is the same view showing the condition of the air transfer valve during normal fuel flow into the tank.
Figure 3:
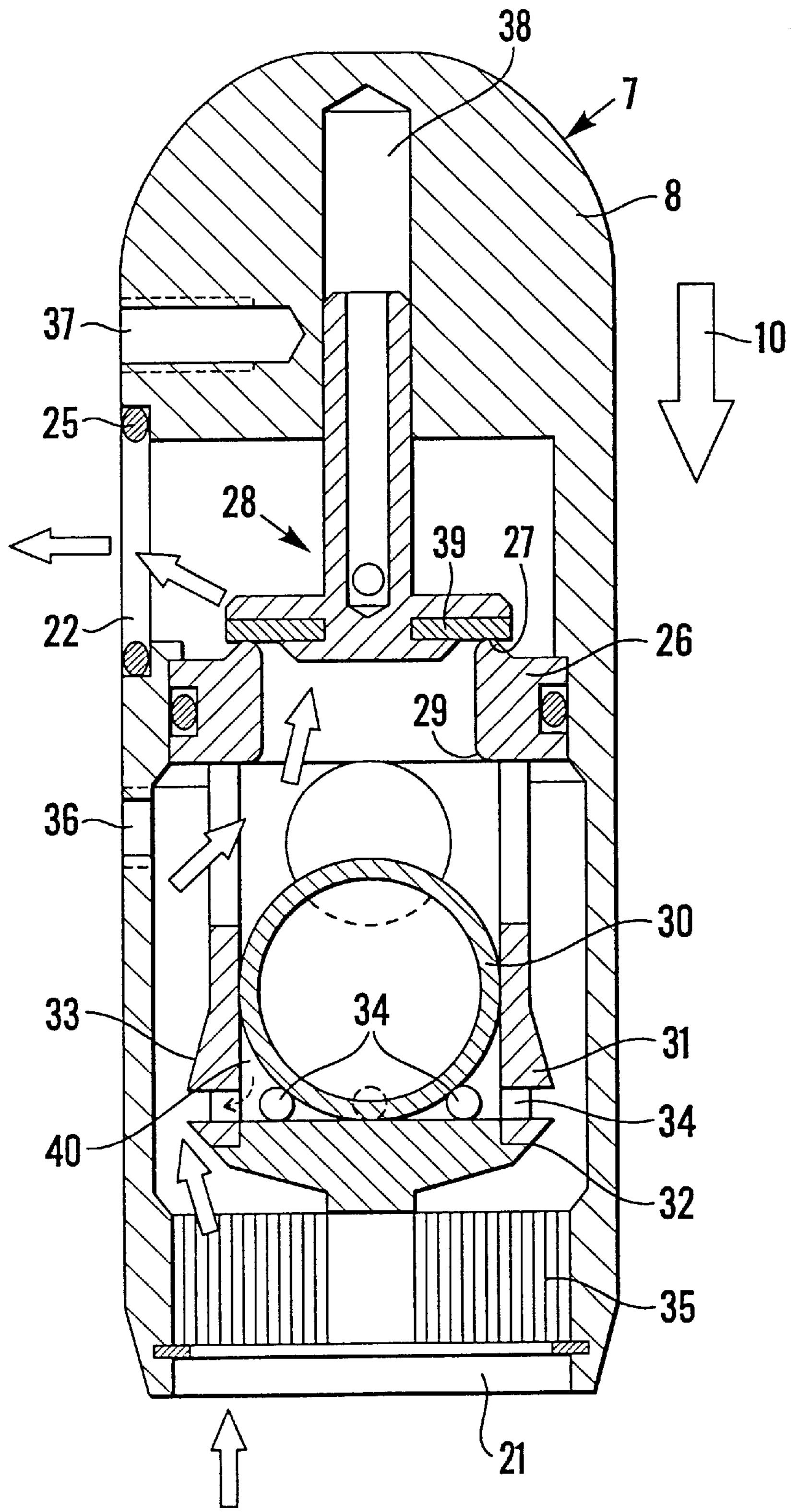
FIG. 3 is a longitudinal section through the air transfer valve on a larger scale.

The air transfer valve is shown in more detail in FIG. 3 and from FIGS. 1–3 it can be seen that the housing 8 includes an inlet 21, directed away from the direction of fluid flow 10, and an outlet 22 into the head space 23 of the fuel tank 2. The housing 8 is secured to the inner wall of the fill pipe by bolts (not shown) passing through holes in the fill pipe and into threaded sockets 36, 37 in the housing 8. Outlet 22 is sealed to a corresponding sized hole in the wall of the fill pipe 1 by means of an "O" ring seal 25. Within the valve housing is located a double seat assembly 26 having a first valve seat 27, onto which the first valve member 28 closes. Valve member 28 is guided for sliding movement in a bore 38 in body 8 and the face of the valve has a soft disc-like liner 39 arranged to contact the raised annular seat 27 in the closed position. Valve member 28 is normally in the closed position as shown in FIG. 3, either because of the weight of the valve member or by virtue of a light closure spring, e.g. a coil spring (not shown). Valve member 28 is a non-return or "check" valve since it only allows one-way flow.

Seat assembly 26 also has a second set 29, against which a float member 30 may close to prevent liquid passing directly into the head space 23 of the tank as will be described hereinafter.

Referring again to FIG. 1, this shows a typical initial filling condition in which an advancing column of fuel first arrives at the T-piece 6, carrying in front of it a mass of air 1 1. This mass of air 11 is compressed by the advancing column of fuel 13, causing pressure to rise in the space at the head of the fill pipe 1. Increased pressure causes the valve member 28 to rise off its seat 27, as shown in FIG. 1, and for air to flow through the inlet 2 1, around the float member 30 and through the outlet 22 into the tank ullage, as shown by the arrow in FIG. 33.

As can be seen in FIG. 3, the float member 30 normally rests within an enclosure 31, having chamfered outer faces 32 and 33, and outlets 34 for the draining of liquid within enclosure 31. Preferably, float member 30 is comprised of a hollow sphere-shaped ball that is lightweight and made from fuel-resistant plastics material. As a result of air flowing through the gap between the housing and the chamfered outer faces 32 and 33 of enclosure 31, an effect is similar to the condition found in a venturi meter (venturi effect) is generated which causes air to be sucked out of the space between the float member 30 and the lower part 40 of enclosure 31, thereby restraining the float member 30 from moving upwardly onto the valve seat 29, when air flows into the inlet 21 under the influence of increased pressure within the fill pipe.

As shown in FIG. 3, the inlet 21 to the housing 8 is protected with a flame arrester 35. This may be, for example, of the gauze-type but is preferably of the ribbon type comprising a corrugated stripe of thin metal sheet.

FIG. 2 shows the situation after the air has passed out of the air transfer valve, and the column of moving fuel is then sweeping past the air transfer valve. In this condition, a zone of reduced pressure is initially formed at the transfer valve inlet 21. Valve member 28 is closed under the combined effects of the vacuum zone, vapour pressure in the ullage and the weight of the valve member 28 itself. As back pressure gradually increases in the fill pipe due to the rising tank level, and liquid fuel enters the housing 8, the effect is to lift the float member 30 and cause it to rise and float in the liquid, thereby seating against the seat 29. Gradually increasing pressure in the fill pipe does not cause a significant gas flow through the gap between the housing and the faces 32, 33 and therefore there is little or no venturi suction effect in the outlets 34. This upward movement of the float member 30 and seating on seat 29 provides a positive safeguard against the transfer of liquid of directly from the fill pipe into the ullage. When the delivery is complete, the pressure in the ullage and fill pipe equalise and the float valve drops back into the enclosure 31. In this condition, the valve member 28 will also be on its seat 27 because of its weight or light return spring. The flame arrester 35 has the effect to some extent of separating vapour from liquid fuel so that when the mixture of vapour and liquid fuel reaches the inlet 21, the vapour will preferentially pass through.

Figure 5:
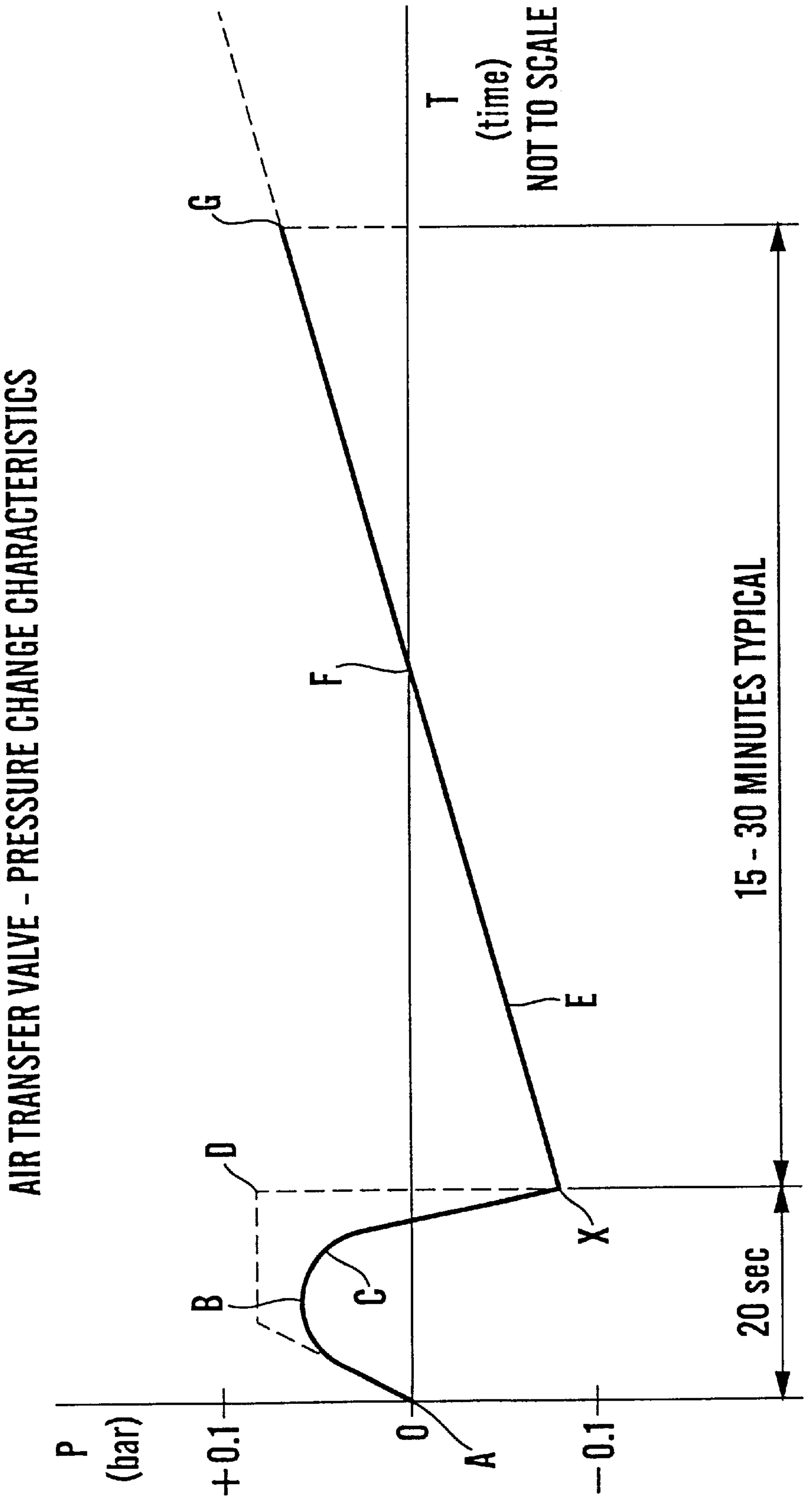
FIG. 5 is a graph showing the change of air pressure at the inlet to the air transfer valve at various times in the filling process.

FIG. 5 is a graph showing pressure changes against elapsed time after commencing filling of the tank. At time zero (point A), the road tanker begins to fill the tank. Initially this causes pressure in the fill pipe 1 to rise as air in the fill pipe is compressed by the advancing column of fuel 12 arriving from the tanker (see FIG. 1). With the air transfer valve 7 installed, the pressure change is shown by the curve C. The compressed air is relieved through the air transfer valve and pressure falls in a smooth curved from point B. Superimposed on this part of the graph are the pressure changes (shown in broken lines) in a case where no air transfer valve 7 is fitted. As can be seen, the maximum pressure developed is higher, and the pressure falls more abruptly from the point D as compressed air is vented down the fill pipe 1 and through the fuel in the tank, causing turbulence and undesired generation of vapour. With the air transfer valve 7 in place, the compressed air is vented preferentially through the transfer valve 7 because flow through the vale involves a lower resistance than through liquid 4 at the lower end of the fill pipe 1. In order to optimise the relief of air pressure through the air transfer valve 7, the size of the effective orifice through the air transfer valve relative to the effective airflow of the fill pipe 1 should be selected such that flow of air through the air transfer valve is approximately equal to or greater than the flow of liquid through the fill pipe. For example, if the fuel tank is intended to be filled at a rate of 1000 litres per minute, the air transfer valve 7 is preferably designed to bleed air from the fill pipe 1 at about the same rate. Air will flow through an orifice of about 10–15 mm diameter at about 1000 litres per minute, while liquid fuel will flow at about 1000 litres per minute through a pipe having a minimum opening of about 75–80 mm diameter. An orifice area rate for air/fuel of about 1:6 is generally satisfactory. At the same time, in order to minimise the restriction effect for fuel flow in the fill pipe, the cross-sectional area of the housing of the air transfer valve should be small in comparison with the cross-sectional area of the pipe.

Referring again FIG. 5, the pressure continues to fall from a positive pressure at point B to a negative pressure because a siphon effect produced in the vertical fill pipe as the fluid falls to the tank level. As the tank fills, the pressure reaches a minimum at point X and pressure gradually rises along line E. At point F the pressure becomes positive as the resistance pressure drop exceeds the diminished 'drop pipe effect'.

While the pressure is negative, the diminished pressure in the fill pipe assists the closure of the non-return valve 28, and relatively higher pressure in the ullage also urges the valve 28 to close.

As the pressure in the fill pipe 1 switches to positive after point F and the fill pipe 1 continues to be filled, the float member 30 is lifted by liquid in the fill pipe and closes onto its seat 30, this preventing liquid from flowing through the air transfer valve.

At the fill stop, point G, pressure reaches the hydrostatic pressure difference between the tanker fuel level and air transfer valve. After disconnecting the tanker hose, the pressure then returns to atmospheric pressure, and the valve members 28 and 30 in the air transfer valve revert to their initial condition.

Figure 4:
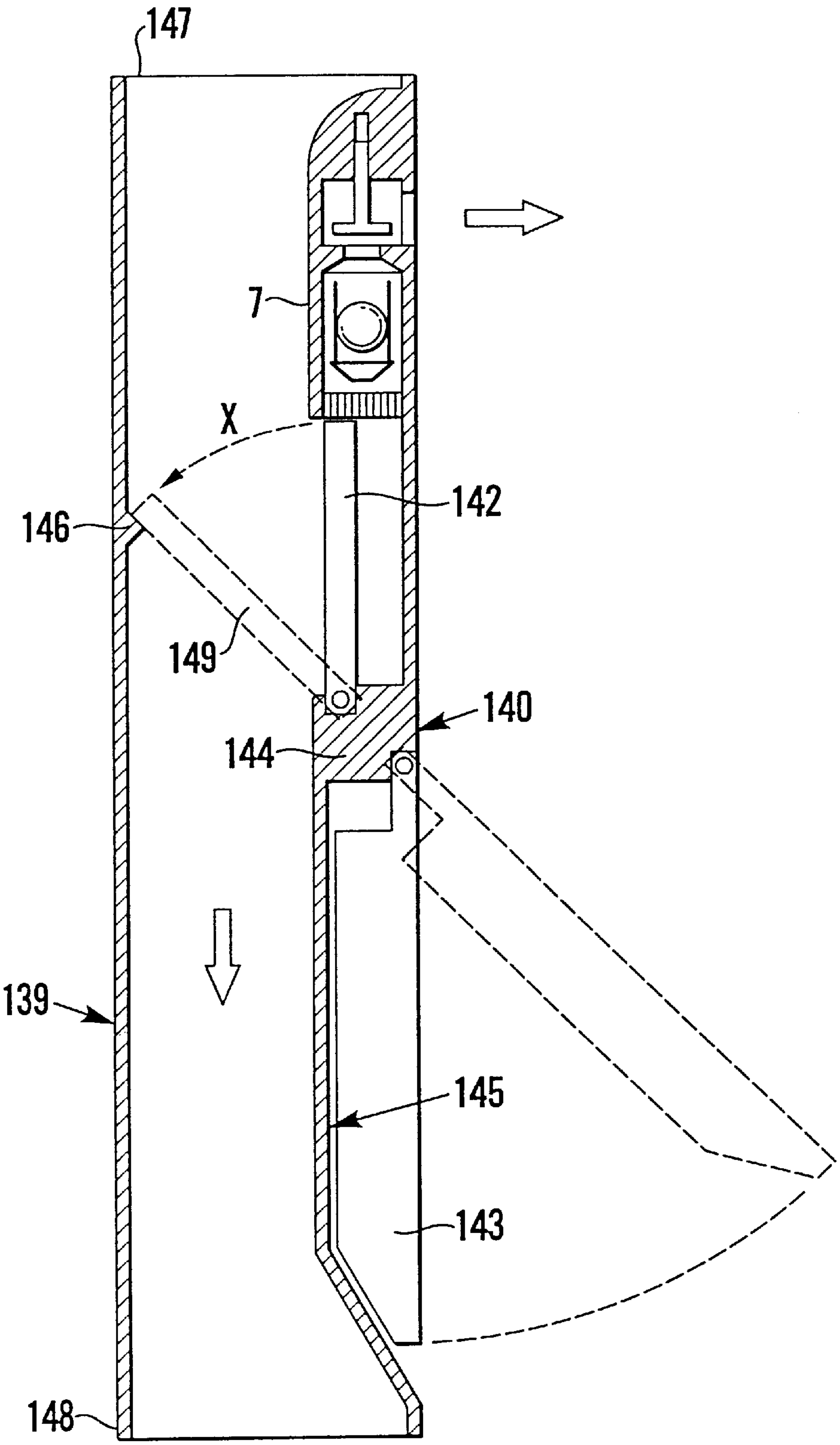
FIG. 4 is a longitudinal section through a fill pipe fitted with an air transfer valve in accordance with the invention, but on a larger scale than FIGS. 1 and 2 and showing an overfill valve fitted into a tubular housing member.

Referring now to FIG. 4, this shows a modification in which air transfer valve 7 is mounted in a tubular member 139, with an overfill valve 140. The tubular member 139 has the same diameter as the fill pipe 1 shown in FIGS. 1 and 2, and can be fitted to a standard fill pipe of appropriate length by a conventional spigot or pipe coupling at its upper and lower ends 147 and 148. Thus, the overfill valve and the air transfer valve can be manufactured and assembled as a single unit and fitted to the fill pipe of a fuel tank.

The construction and location of the air transfer valve 7 is as shown in FIG. 4.

The overfill valve 140 shown in the drawing is of a simple construction and is of a type which is conventionally fitted to fill pipes without requiring any external connections. Valves of this type are commercially available, for example, from OPW Fuel & Components, P.O. Box 405003, Cincinnati, Ohio 45240/5003. The overfill valve is mounted on the same side of the fill pipe as the air transfer valve, and comprises a flap valve 142 in the form of a vane 149 and a float assembly 143. The float assembly comprises a hollow paddle-shaped member pivotably mounted on a support member 144 attached to an integral part of the wall of the tubular member. Flap valve 142 is also pivotably mounted on the support member 144, and is linked to the float 143 so that the two components pivot together. Thus, the longitudinal axis of flap valve 142 and float assembly 143 are always aligned parallel in relation to a common axis. As shown in the drawings, float 143 nests in a recess 145 in its rest position.

FIG. 4 shows in broken lines the position of the float assembly 143 and vane 149 when liquid in the tank has risen to a point approximating to the level of the support member 144. In this position, the float assembly is floated upwardly in the liquid fuel and causes the vane 144 of the flap valve 142 to pivot in the direction of arrow X until it hits a stop 146 on the inside of the tubular member. The vane 149 of the flap valve is shaped so that in the position shown in dotted lines, it essentially blocks the tubular member. In other words, it will be a plate that is essentially oval in shape, with the smaller diameter approximating to the diameter of the fill pipe. Closure of the flap valve 142 will transmit a pressure signal along the pipe 5 (shown in FIG. 1), which will be sensed by the operator of the road tanker, who will then shut off the flow of fuel at the road tanker. Liquid fuel in the supply pipe will leak past the vane 149 and enter the tank. Meanwhile, liquid fuel flowing past the air transfer valve and entering inlet 21 will raise the float ball and this will prevent liquid fuel entering the ullage.

Although a particular type of overfill valve is described above, it will be appreciated that the air transfer valve 7 of the invention can equally be used in conjunction with other types of overfill valves.

In the embodiment described in the drawings, the air transfer valve 7 is attached to the internal wall of the fill pipe 1 so that its outlet communicates directly with the ullage located in head space 23. Although this is advantageous, it is also possible to connect the outlet 22 to the ullage via a conduit (not shown). In cases where the air transfer valve 7 is fitted within the top of the fill pipe or in the T-piece 6, it may be necessary or convenient to provide a pipe connecting the outlet 22 with the ullage, perhaps through an aperture in the manhole cover 3.

I claim:

1. A liquid fuel storage tank having a fill pipe extending downwardly into the tank for introducing fuel therein, said fill pipe having an air transfer valve mounted on an interior wall thereof, the air transfer valve having an outlet communicating through said wall for venting gas in the fill pipe above the level of fuel therein when said fuel level rises in said fill pipe thereby allowing the venting gas to open the valve and pass through said outlet directly into the storage tank, and whereby a decrease in the fuel level in said fill pipe allows said valve to return to a closed position, and a level responsive overfill device mounted in the fill tube for preventing over filling of the storage tank by shutting of fuel flow in the fill pipe when fuel in the storage tank rises above a predetermined level.

2. A storage tank as claimed in claim 1 wherein the overfill device comprises a float pivotally mounted with respect to the fill pipe and a flap member linked to the float and adapted to block passage of liquid through the fill pipe on actuation of the float, the air transfer valve being mounted in the pipe above the float.

3. A storage tank as claimed in claim 1 wherein the outlet from the air transfer valve is sealed to the hole in the fill pipe.

4. A storage tank as claimed in claim 1 wherein a flame arrester is mounted over the inlet of the air transfer valve to prevent flame propagation from the fill pipe into the storage tank.

5. A storage tank as claimed in claim 1 wherein the air transfer valve comprises a housing having an outlet and an inlet, the outlet being controlled by a first non-return valve which is biased to its closed position, the valve being adapted to open and allow passage of gas into the storage tank in the event that pressure rises in the fill pipe.

6. A storage tank as claimed in claim 2 wherein the float is pivotally mounted exteriorly of the fill pipe and is linked to a vane member mounted to pivot within the fill pipe.

7. An air transfer valve and flap valve assembly for a fuel storage tank, said assembly comprising:

(a) a fill pipe having an interior wall with a hole therein;

(b) an air transfer valve mounted on the wall of the fill pipe and having an outlet aligned a communicating with said hole for venting gas from the fill pipe above the level of fuel therein when said level rises in said fuel pipe thereby allowing the venting gas to open the valve and pass through the hole into the storage tank and whereby a decrease in the fuel level in said fill pipe allows said valve to return to a closed position;

(c) an overfill valve mounted in the fill pipe, said overfill valve including a float member pivotally mounted on an exterior wall of the fill pipe and a flap member mounted above the float valve and linked to said float member so that on actuation of the float member by rise of liquid in the tank beyond a predetermined level, the flap member is moved to block passage of liquid through the fill pipe.

8. An air transfer valve and overfill valve assembly for use in a liquid storage tank, said assembly comprising:

(a) a fill pipe having interior and exterior surfaces;

(b) an air transfer valve mounted in the fill pipe adjacent to an interior wall surface thereof, said air transfer valve having an inlet communicating with the interior of the fill pipe and an outlet sealed to a hole through said fill pipe so that, as the liquid level rises in said fill pipe, gas at elevated pressure in the fill pipe above the level of fuel therein can open said valve and vent through said outlet into the storage tank and as the liquid level decreases in said fill pipe, said valve can close; and (c) a level responsive overfill valve mounted within the fill pipe and effective to shut off flow of liquid in the fill pipe on detecting a rise of liquid in the tank beyond a predetermined level, wherein said air transfer valve includes a valve member which is normally biased to a closed position and is arranged to control flow of gas through said outlet, the valve member opening in response to a gas pressure increase within the fill pipe and closing in response to a gas pressure drop in the fill pipe as a function of the fuel level in the fill pipe.

9. An assembly for controlling liquid fuel flow into a fuel storage tank, said assembly comprising:

a fill pipe, an air transfer valve disposed within the fill pipe and mounted in a housing on an interior wall of the fill pipe, the air transfer valve having an inlet communicating with the interior of the fill pipe and an outlet communicating with a hole through the interior wall for venting air into the storage tank, wherein said air transfer valve comprises a first non-return valve located within the housing between said inlet and said outlet, and which is biased in a closed position, the non-return valve being adapted to open and allow air in the fill pipe above the level of fuel therein to pass through said outlet and said hole into the storage tank when it exceeds a predetermined level; and a level responsive overfill valve mounted in the fill pipe, said overfill valve preventing over filling of the fuel storage tank by shutting off fuel in the fill pipe when fuel in the storage tank rises above a predetermined level.

10. An assembly as claimed in claim 9 wherein a second valve is operative to control the outlet to prevent the passage of liquid through the air transfer valve and into the liquid storage tank, the second valve being located in the interior of the housing, and wherein the second valve is biased in an open position, and closes in response to liquid rising in the fill pipe to a predetermined level.

* * * * *

UNITED STATES PATENT AND TRADEMARK OFFICE

CERTIFICATE OF CORRECTION

PATENT NO: 6,138,707

DATED: October 31, 2000

INVENTOR(S): Graham M. Stuart

It is certified that error appears in the above-identified patent and that said Letters Patent are hereby corrected as shown below:

Column 7, claim 7, line 31, delete "a" and substitute therefore --and--.

Signed and Sealed this

Sixth Day of March, 2001

*Attest:*

NICHOLAS P. GODICI

*Attesting Officer*

*Acting Director of the United States Patent and Trademark Office*